United States Patent
Hsieh et al.

(10) Patent No.: US 8,526,174 B2
(45) Date of Patent: Sep. 3, 2013

(54) MOUNTING APPARATUS FOR DISK DRIVES WITH DIFFERENT SIZE

(75) Inventors: Kun-Chi Hsieh, Tu-Cheng (TW); Li Tong, Shenzhen (CN); Hai-Tao Shan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 157 days.

(21) Appl. No.: 13/104,960

(22) Filed: May 10, 2011

(65) Prior Publication Data

US 2012/0074274 A1    Mar. 29, 2012

(30) Foreign Application Priority Data

Sep. 24, 2010   (CN) .......................... 2010 1 0289449

(51) Int. Cl.
*G06F 1/16* (2006.01)
*H05K 5/00* (2006.01)
*H05K 7/00* (2006.01)

(52) U.S. Cl.
USPC ............... 361/679.33; 361/679.37; 248/27.1; 248/27.3

(58) Field of Classification Search
USPC ........ 248/27.1, 27.3, 220.21, 221.11, 222.11, 248/225.11, 611, 612; 361/679.33, 679.37, 361/679.57, 679.38, 679.39
See application file for complete search history.

(56) References Cited

U.S. PATENT DOCUMENTS

| | | | | |
|---|---|---|---|---|
| 6,798,653 B2 * | 9/2004 | Chen et al. | ............... | 361/679.33 |
| 7,035,099 B2 * | 4/2006 | Wu | .......... | 361/679.33 |
| 7,450,376 B2 * | 11/2008 | Chen et al. | ............... | 361/679.33 |
| 7,460,365 B2 * | 12/2008 | Morris | .................... | 361/679.33 |
| 7,489,504 B2 * | 2/2009 | Chen et al. | ............... | 361/679.37 |
| 7,523,901 B2 * | 4/2009 | Wu et al. | ................. | 248/225.21 |
| 2006/0002075 A1 * | 1/2006 | Wei-Chieh et al. | ........... | 361/685 |
| 2007/0025068 A1 * | 2/2007 | Chen et al. | .................... | 361/679 |
| 2007/0115587 A1 * | 5/2007 | Hood et al. | .................... | 360/137 |
| 2008/0080129 A1 * | 4/2008 | Morris | .......................... | 361/685 |
| 2008/0137281 A1 * | 6/2008 | Chen et al. | .................... | 361/685 |

* cited by examiner

*Primary Examiner* — Nkeisha Smith
(74) *Attorney, Agent, or Firm* — Altis Law Group, Inc.

(57) ABSTRACT

A mounting apparatus includes a drive bracket, a maintaining plate and a mounting bracket, the drive bracket includes a bottom plate, a first side plate and a second side plate, a receiving space is defined among the bottom plate, the first side plate and the second side plate, the receiving space is divided into a top portion and bottom portion by the maintaining plate. The top portion is adapted to secure a first disk drive, the mounting bracket is secured to the bottom portion of the two portions and configured for securing a second disk drive that is smaller than the first disk drive.

14 Claims, 7 Drawing Sheets

MOUNTING APPARATUS FOR DISK DRIVES WITH DIFFERENT SIZE

REARGROUND

1. Technical Field

The present disclosure relates to mounting apparatuses and particularly to a mounting apparatus for securing a disk drive.

2. Description of Related Art

A computer system usually includes a disk drive, such as a hard disk drive, or a CD-Rom drive. The disk drive is installed in a drive bracket. Usually, the drive bracket determines the size of disk drive, therefore securing different size disk drives is inconvenient. Therefore, there is room for improvement.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
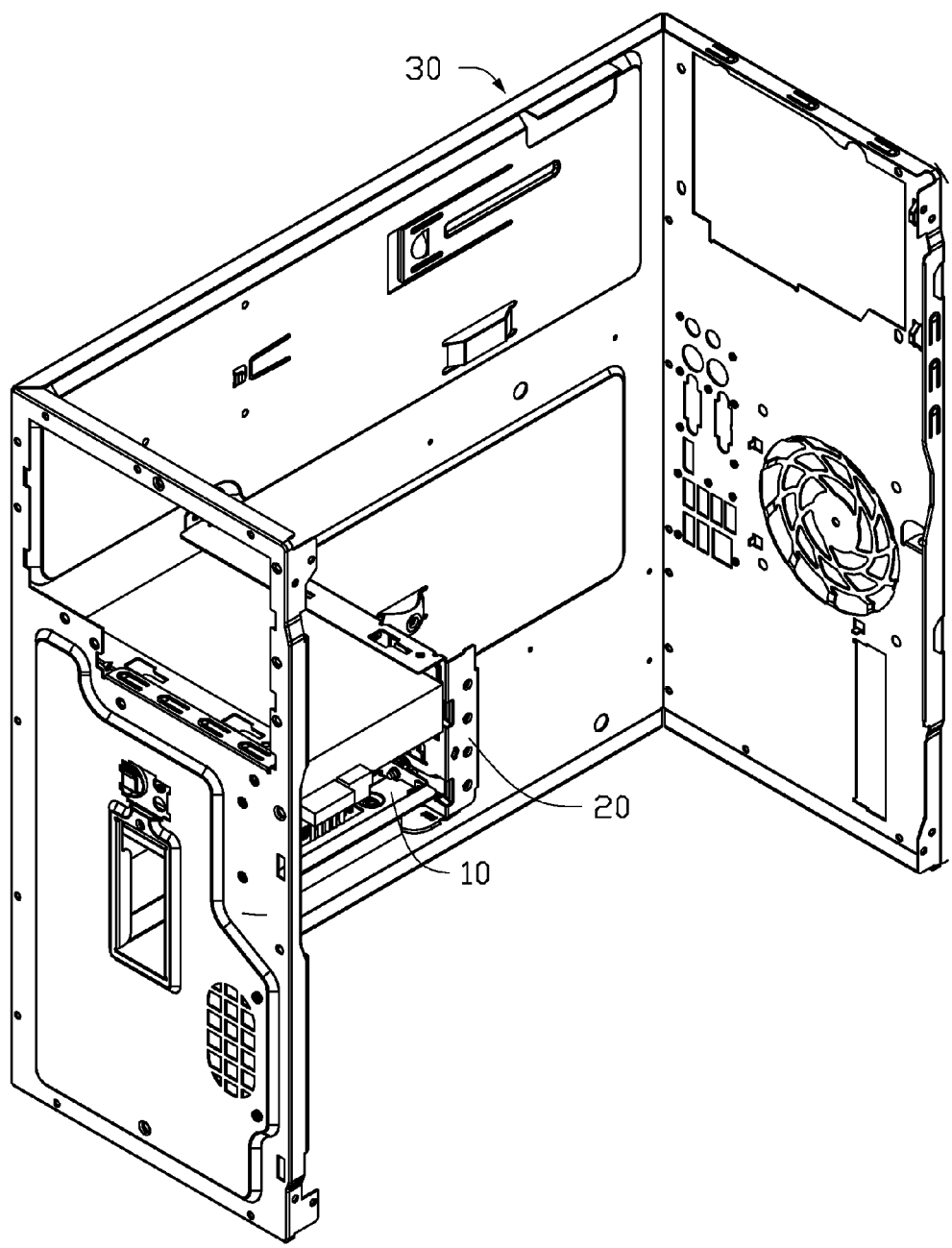
FIG. 1 is an assembled, isometric view of a mounting apparatus and a chassis in accordance with one embodiment.
Figure 2:
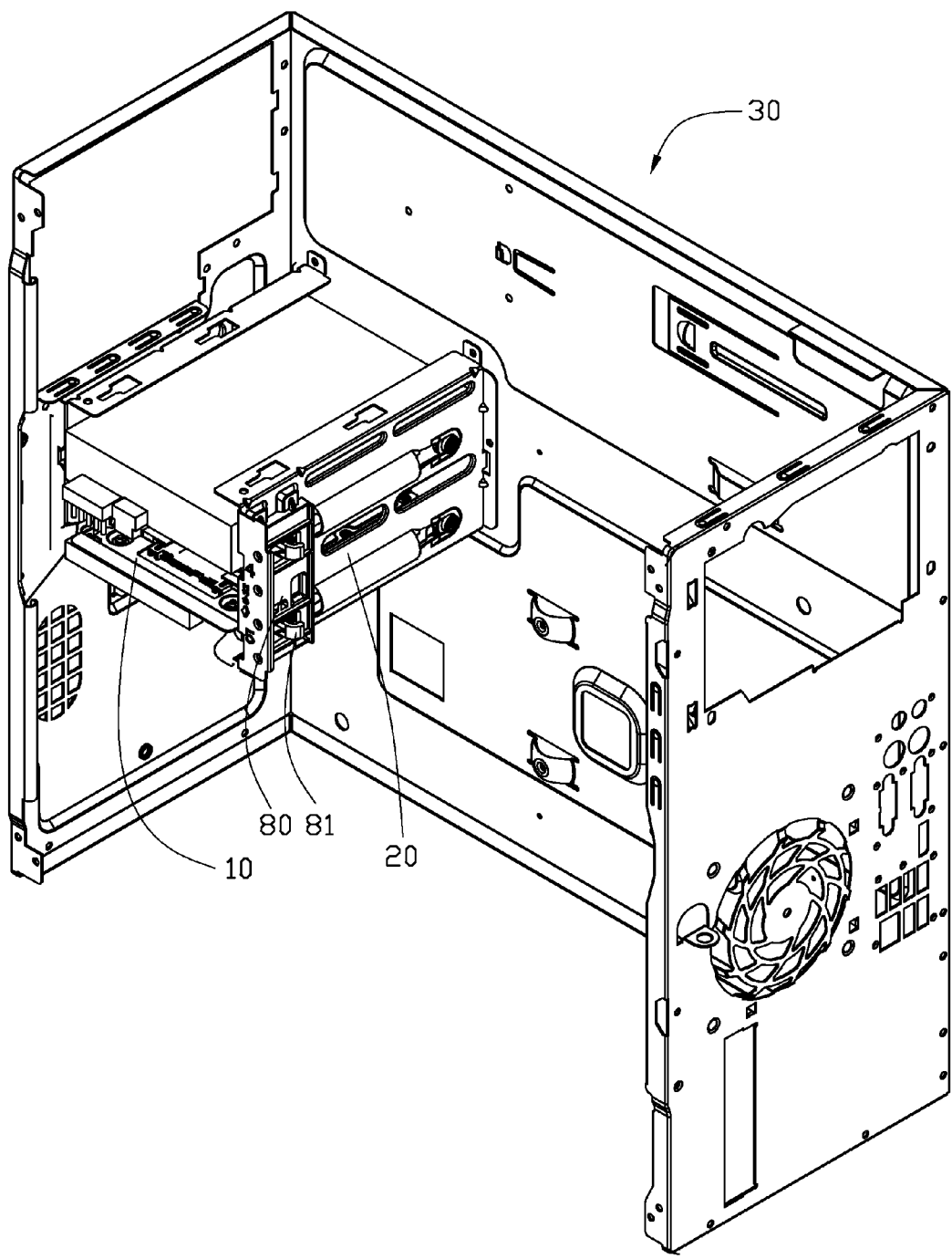
FIG. 2 is similar to FIG. 1, but viewed in a different aspect.

Referring to FIG. 1 and FIG. 2, according to one embodiment, a mounting device for disk drive includes a mounting bracket 10 and a drive bracket 20. The mounting bracket 10 is secured to the drive bracket 20, and the drive bracket 20 is secured to a chassis 30.

Figure 3:
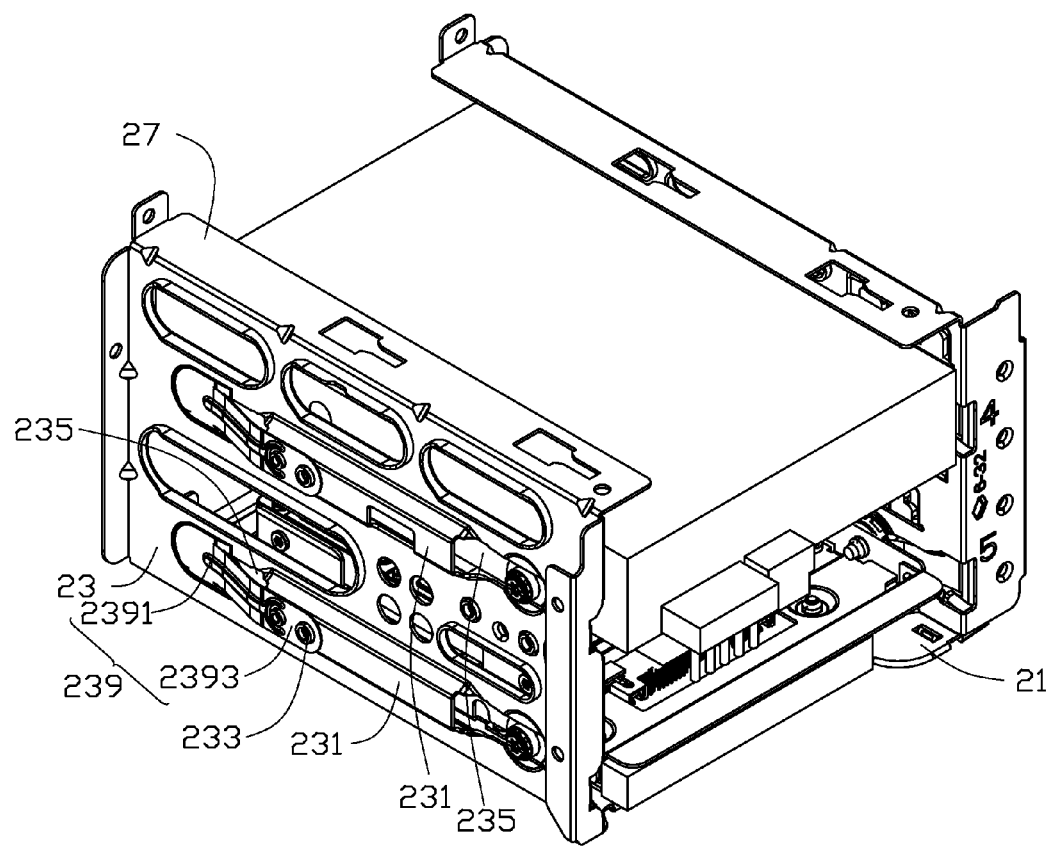
FIG. 3 is similar to FIG. 2, but the chassis is not shown.
Figure 4:
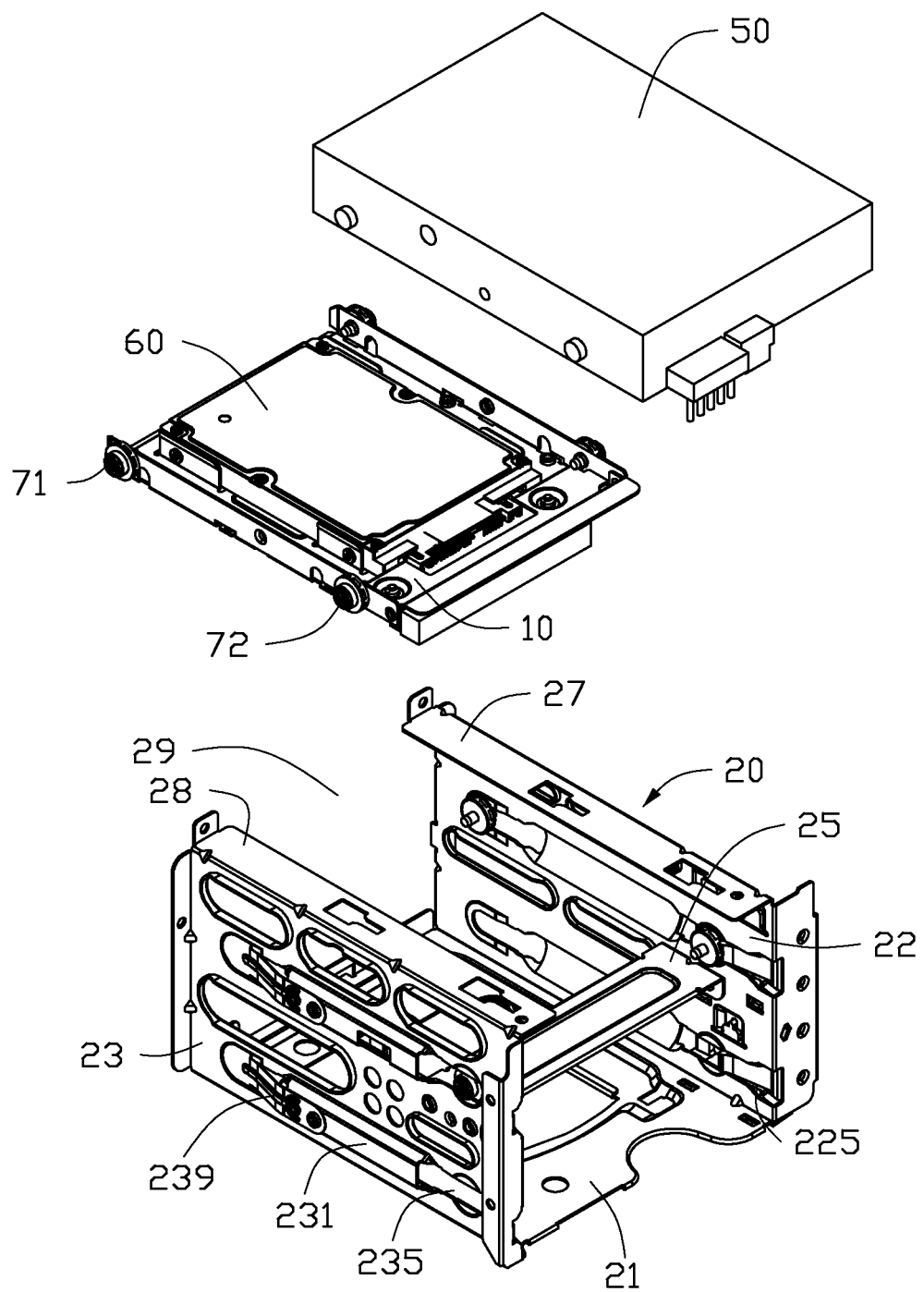
FIG. 4 is an exploded, isometric view of FIG. 3.

Referring to FIG. 3 and FIG. 4, the drive bracket 20 includes a bottom plate 21, a first side plate 22, and a second side plate 23 that is opposite to the first side plate 22. The first and second side plates 22, 23 are located on the bottom plate 21. A first flange 27 extends from a top edge of the first side plate 22, and a second flange 28 extends from a top edge of the second side plate 23. In an embodiment, the first and second side plates 22, 23 are substantially perpendicular to the bottom plate 21, and the first and second flanges 27, 28 are substantially perpendicular to the first and second side plates 22, 23. A receiving space 29 is defined by the bottom plate 21, the first side plate 22, the second side plate 23, the first flange 27, and the second flange 28. A maintaining plate 25 is secured to the first side plate 22 and the second side plate 23, to divide the receiving space 29 into a top portion and a bottom portion. In an embodiment, the maintaining plate 25 is substantially parallel to the bottom plate 21. A first slot 225 is defined in the first side plate 22, and a second slot 235 is defined in the second side plate 23. A connecting portion 231 is connected to the top edge and the bottom edge of the second slot 235. Two protrusions 233 are located on the outer surface of the connecting portion 231 on the second side plate 23. A resilient piece 239 is located on the connecting portion 231 and extends along the second slot 235. The resilient piece 239 includes a pressing portion 2391 and a latching portion 2393. The pressing portion 2391 is located in an end of the slot 235, the latching portion 2393 is engaged with the two protrusions 233. Referring to FIG. 2, a positioning member 80 is secured to a side of the first side plate 22. The positioning member 80 includes two latches 81. The two latches 81 are elastically deformable.

Figure 5:
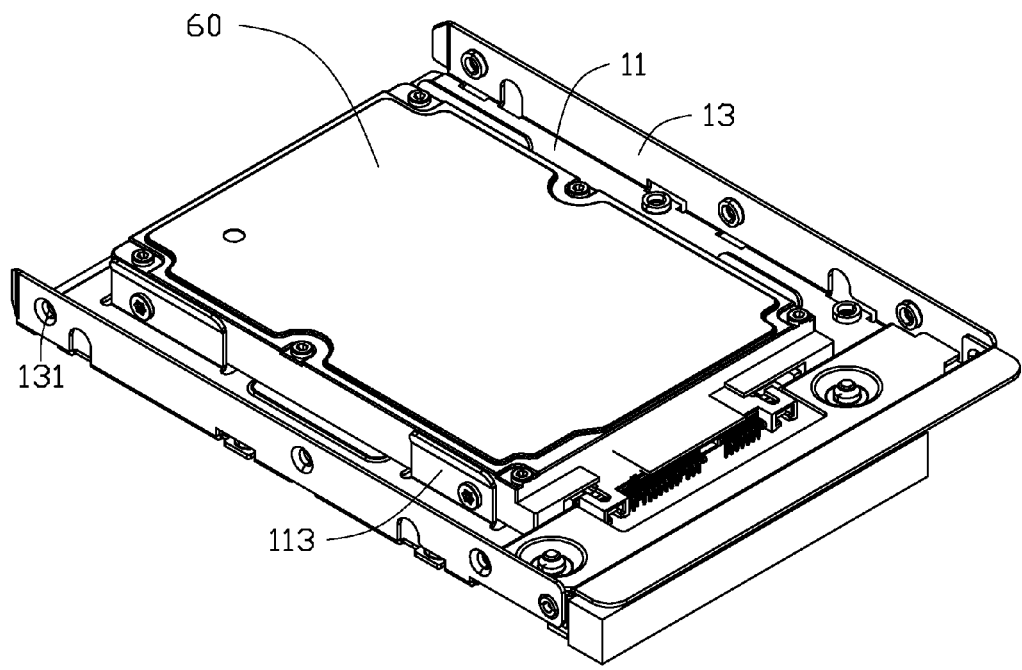
FIG. 5 is an assembled, isometric view of a mounting bracket and a second disk drive of FIG. 4.
Figure 6:
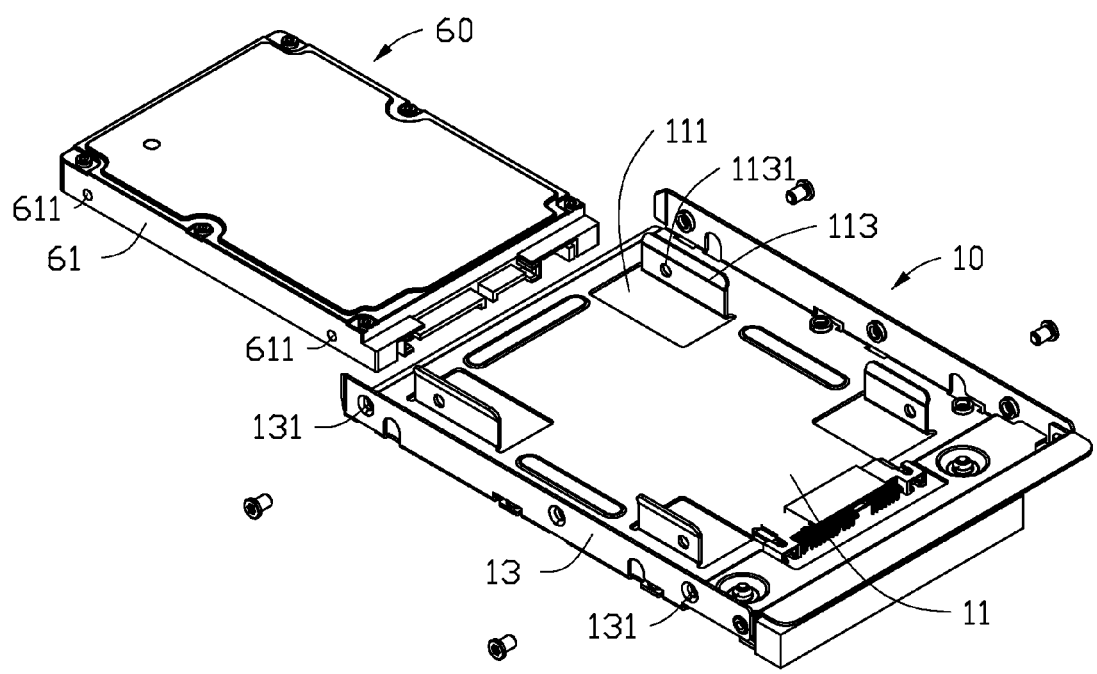
FIG. 6 is an exploded, isometric view of FIG. 5.
Figure 7:
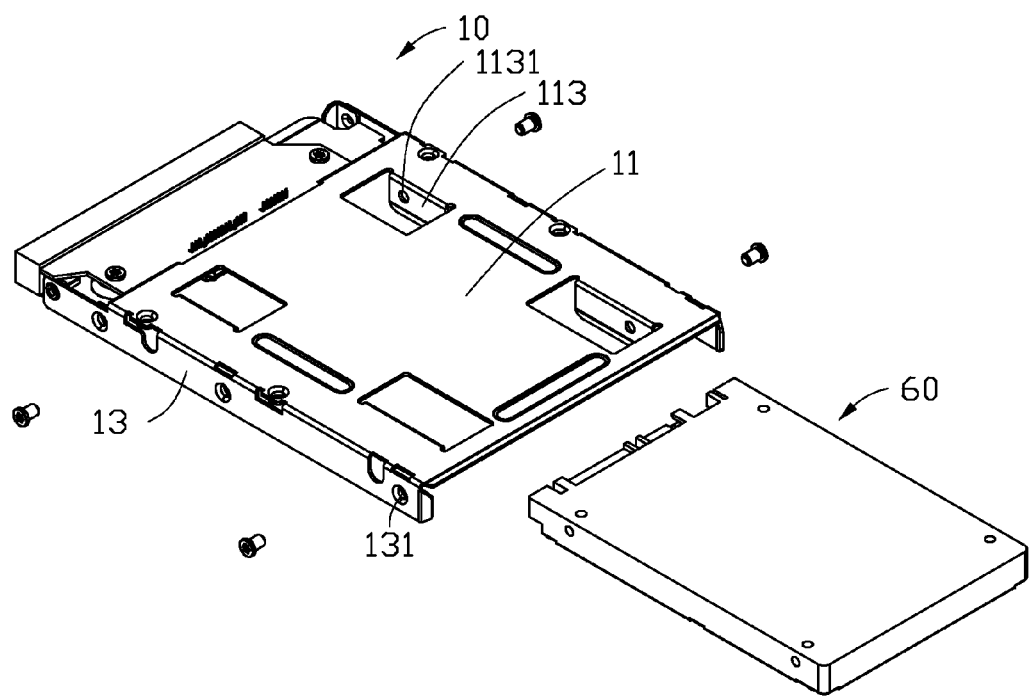
FIG. 7 is similar to FIG. 6, but viewed in a different aspect.

Referring to from FIG. 5 to FIG. 7, the mounting bracket 10 includes a bottom wall 11 and two opposite sidewalls 13, located on the bottom wall 11. In an embodiment, the bottom wall 11 is substantially perpendicular to the two sidewalls 13. Four limiting pieces 113 are located on the bottom wall 11. Each limiting piece 113 defines a mounting hole 1131. The four limiting pieces are substantially parallel to the bottom wall 11. Each sidewall 13 defines two positioning holes 131. Two first locking members 71 and two second locking members 72 are secured in the positioning holes 131. In one embodiment, the two first locking members 71 and the two second locking members 72 may be screws.

A first disk drive 50 is secured to the top portion of the receiving space 29. In one embodiment, the first disk drive 50 may be a 3.5 inch hard disk drive.

A second disk drive 60 includes two side boards 61. Each side board 61 defines two locking holes 611. In one embodiment, the second disk drive 60 may be a 2.5 inch hard disk drive.

In assembly of the second disk drive 60, the second disk drive 60 is located among the bottom wall 11 and the four limiting pieces 113. Each side board 61 abuts two of the four limiting pieces 113. The locking holes 611 are correspondingly aligned with the mounting holes 1131. The second disk drive 60 is secured among the four limiting pieces 113 by a plurality of locking members, such as screws, engaged in the locking holes 611 and the mounting holes 1131.

In assembly of the mounting bracket 10, the two sidewalls 13 correspondingly abut the inner surfaces of first side plate 22 and second side plate 23. The two first locking members 71 are located in the first slot 225 and the second slot 235 and extend out of the first side plate 22 and second side plate 23. The mounting bracket 10 is guided into the receiving space 29 along the first slot 225 and the second slot 235. The latch 81 is elastically deformed by one of the two first locking members 71. The two second locking members 72 are located in the first slot 225 and the second slot 235, and extend out of the first side plate 22 and second side plate 23. Until the two first locking members 71 are blocked by an end of the first slot 225 and the second slot 235, the latch 81 is elastically deformed by one of the two second locking members 72. The resilient piece 239 is elastically deformed by one of the two first locking members 71. One of the two second locking members 72 is engaged in the receiving hole of the positioning member 80. The latch 81 rebounds to prevent the mounting bracket 10 from sliding out of the drive bracket 20. The resilient piece 239 rebounds to bias the mounting bracket 10 towards the first side plate 22, for securing the mounting bracket 10 between the first side plate 22 and the second side plate 23.

In disassembly of the mounting bracket 10, the latch 81 is rotated, and one of the two second locking members 72 disengages from the receiving hole of the positioning member 80. The mounting bracket 10 slides out of the drive bracket 20 along the first slot 225 and the second slot 235.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a drive bracket comprising a bottom plate, a first side plate, and a second side plate; a receiving space defined among the bottom plate, the first side plate and the second side plate; the receiving space comprising a top portion and a bottom portion, the top portion is adapted to secure a first disk drive; and
a mounting bracket adapted to receive a second disk drive that is smaller than the first disk drive, and located in the bottom portion; the mounting bracket comprising a bottom wall and a plurality of limiting pieces located on the bottom wall, and the plurality of limiting pieces adapted to secure the second disk drive;
wherein the plurality of limiting pieces are substantially perpendicular to the bottom wall wherein the mounting bracket further comprises two sidewalls located on the bottom wall, and a distance between the two sidewalls is substantially equal to that between the first side plate and the second side plate; wherein each sidewall secures a first locking member and a second locking member; the first side plate defines a first slot, and the second side plate defines a second slot; and the first locking member and the second locking member are engaged in the first slot and the second slot, and extend out of the first side plate and the second side plate; and wherein a connecting portion is connected to two opposite edges of the second slot, the second side plate comprises a resilient piece, and the resilient piece is secured to the connecting portion.

2. The mounting apparatus of claim 1, wherein a maintaining plate is connected to the first side plate and the second side plate, and the top portion and the bottom portion are divided by the maintaining plate.

3. The mounting apparatus of claim 1, wherein a positioning member is secured to the first side plate, and the positioning member comprises a latch adapted to prevent the second locking member from sliding in the first slot.

4. The mounting apparatus of claim 1, wherein the resilient piece comprises a pressing portion and a latching portion, and the pressing portion is located in an end of the second slot, and abuts the first locking member.

5. The mounting apparatus of claim 4, wherein a protrusion is located on the resilient piece, and the latching portion is engaged with the protrusion.

6. The mounting apparatus of claim 1, wherein the second disk drive is positioned on the bottom wall, the plurality of limiting pieces are located on two opposite sides of the second disk drive, and each limiting piece defines a mounting hole for a locking member to lock through, to secure the second disk drive to the mounting bracket.

7. A mounting apparatus comprising:
a drive bracket comprising a bottom plate, a first side plate and a second side plate;
a maintaining plate connected to the first side plate and the second side plate, the maintaining plate adapted to maintain a first disk drive and securing the first disk drive among the first side plate, the second side plate and the maintaining plate;
a mounting bracket secured among the maintaining plate, the bottom plate, the first side plate and the second side plate, the mounting bracket adapted to secure a second disk drive that is smaller than the first disk drive; and
a positioning member secured to the drive bracket and comprising an elastically deformable latch;
wherein the mounting bracket comprises two sidewalls, each sidewall secures a first locking member and a second locking member; the first locking member and the second locking member of one of the two sidewalls are slidably attached to the first side plate, the first locking member and the second locking member of the other of the two sidewalls are slidably attached to the second side plate, and the elastically deformable latch blocks the second locking member of the one of the two sidewalls on the first side plate wherein the first side plate defines a first slot, and the second side plate defines a second slot; and the first locking member and the second locking member are engaged in the first slot and the second slot, and extend out of the first side plate and the second side plate; and wherein a connecting portion is connected to two opposite edges of the second slot, the second side plate comprises a resilient piece, and the resilient piece is secured to the connecting portion and prevents the mounting bracket from sliding relative to the drive bracket.

8. The mounting apparatus of claim 7, wherein the mounting bracket is substantially parallel to the bottom plate.

9. The mounting apparatus of claim 7, wherein the mounting bracket comprises a bottom wall and a plurality of limiting pieces that are located on the bottom wall, and the plurality of limiting pieces are adapted to secure the second disk drive.

10. The mounting apparatus of claim 9, wherein the plurality of limiting pieces are substantially perpendicular to the bottom wall.

11. The mounting apparatus of claim 7, wherein a distance between the two sidewalls is substantially equal to that between the first side plate and the second side plate.

12. The mounting apparatus of claim 11, wherein the positioning member is secured to the first side plate, and the elastically deformable latch is adjacent to an end of the first slot and engages the second locking member in the first slot.

13. The mounting apparatus of claim 11, wherein the resilient piece comprises a pressing portion and a latching portion, and the pressing portion is located in an end of the second slot, and abuts the first locking member.

14. The mounting apparatus of claim 13, wherein a protrusion is located on the resilient piece, and the latching portion is engaged with the protrusion.

* * * * *